March 10, 1964 H. G. POOLE 3,124,372

TOWING CONNECTIONS

Filed Dec. 26, 1961 8 Sheets-Sheet 1

INVENTOR
Harold G. Poole
By Watson, Cole, Grindle & Watson
Attorneys

March 10, 1964

H. G. POOLE 3,124,372

TOWING CONNECTIONS

Filed Dec. 26, 1961

8 Sheets-Sheet 2

INVENTOR
Harold G. Poole
By Watson, Cole, Grindle + Watson
ATTORNEYS

March 10, 1964 H. G. POOLE 3,124,372

TOWING CONNECTIONS

Filed Dec. 26, 1961 8 Sheets-Sheet 3

INVENTOR
Harold G. Poole
By Watson, Cole, Grindle & Watson
ATTORNEYS

March 10, 1964 H. G. POOLE 3,124,372

TOWING CONNECTIONS

Filed Dec. 26, 1961 8 Sheets-Sheet 4

INVENTOR
Harold G. Poole
By Watson, Cole, Grindle & Watson
ATTORNEYS

March 10, 1964 H. G. POOLE 3,124,372

TOWING CONNECTIONS

Filed Dec. 26, 1961 8 Sheets-Sheet 5

INVENTOR
Harold G. Poole
By Watson, Cole, Grindle & Watson
ATTORNEYS

March 10, 1964 H. G. POOLE 3,124,372

TOWING CONNECTIONS

Filed Dec. 26, 1961 8 Sheets-Sheet 6

INVENTOR
Harold G. Poole
By Watson, Cole, Grindle & Watson
ATTORNEYS

INVENTOR
Harold G. Poole
By Watson, Cole, Grindle & Watson
ATTORNEYS

March 10, 1964 H. G. POOLE 3,124,372

TOWING CONNECTIONS

Filed Dec. 26, 1961 8 Sheets-Sheet 8

Inventor
Harold G. Poole
By Watson, Cole, Grindle & Watson
Attorneys 3,124,372
TOWING CONNECTIONS Harold George Poole, Aspenden House, Aspenden, near Buntingford, Hertfordshire, England Filed Dec. 26, 1961, Ser. No. 161,851
Claims priority, application Great Britain Dec. 28, 1960
14 Claims. (Cl. 280—477)

This invention comprises improvements in or relating to towing connections for vehicles.

According to this invention there is provided a towing connection for connecting two vehicles comprising means permitting articulation in the towing connection about three axes mutually at right angles, hitching means joining adjacent members of the towing connection comprising abutments on the members, hitching being effected by relative movement of the vehicles towards one another first to engage the abutments and then to cause relative swinging of the adjacent members about the abutments to a position appropriate for towing and application of an upward load through the abutments onto one vehicle, and locking means engageable to hold the members in said position.

Several constructions of towing connection, which embody the above and other features of invention, will now be described by way of example, the description making reference to the accompanying drawings of which—

Figures 1, 2:
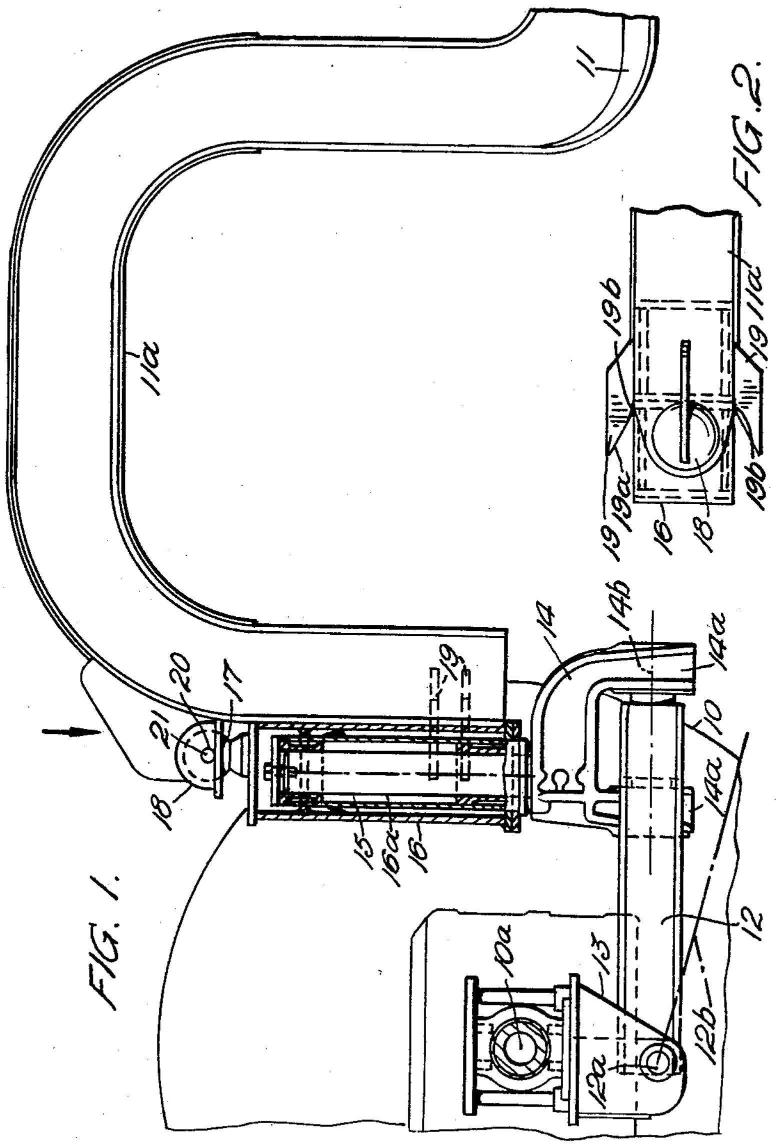
Figures 3, 4, 5:
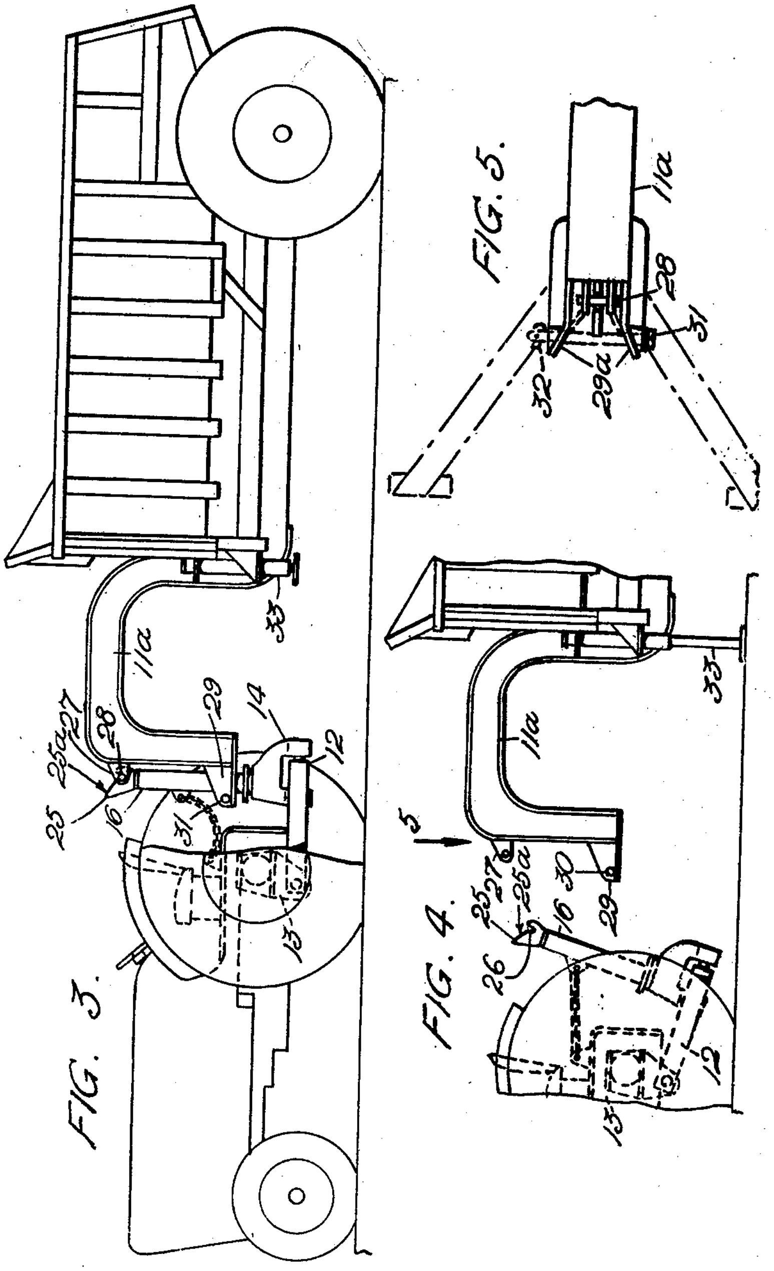
Figure 6:
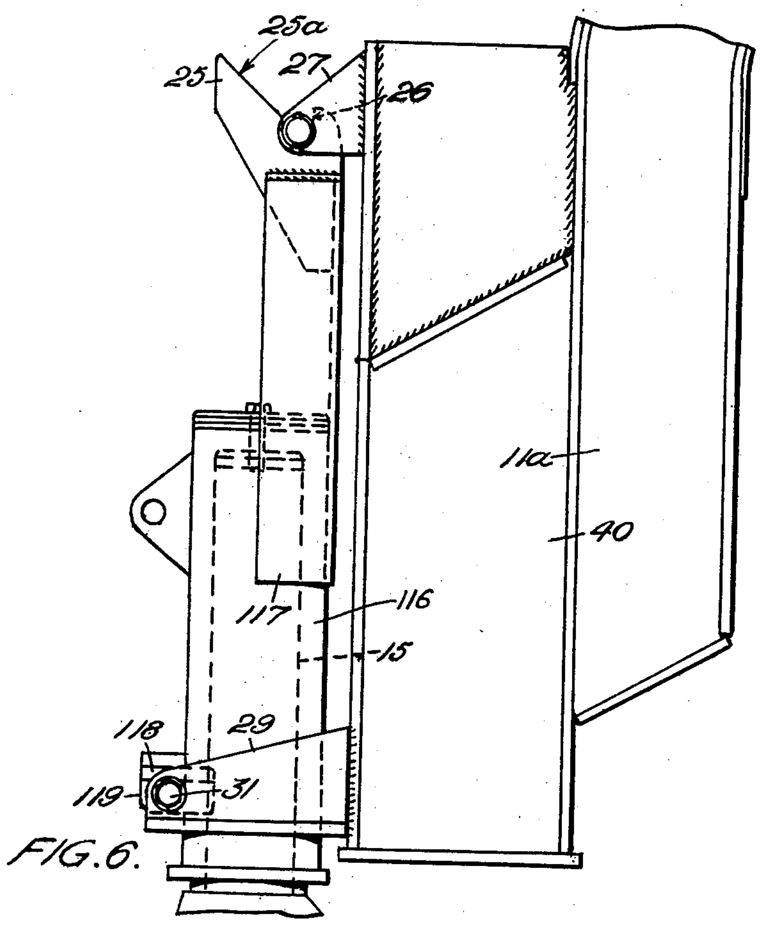
Figure 7:
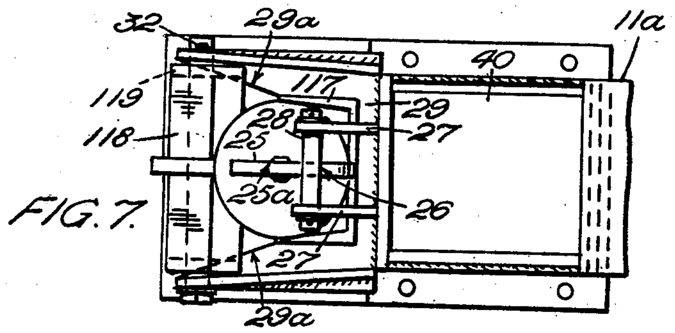
Figures 8, 9:
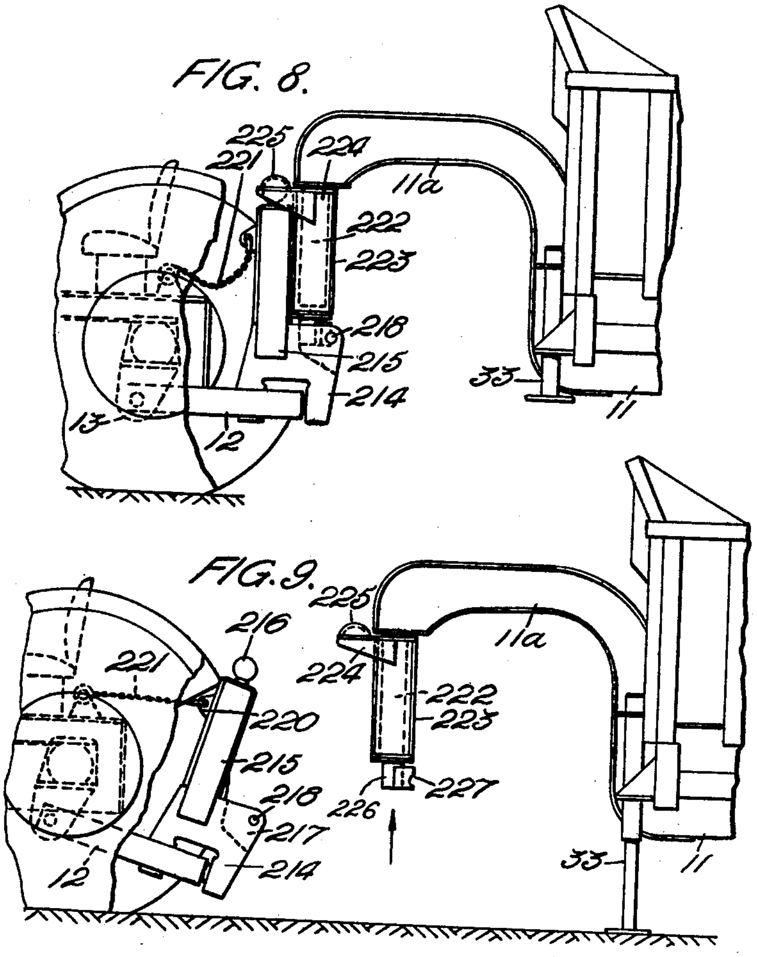
Figures 10, 11:
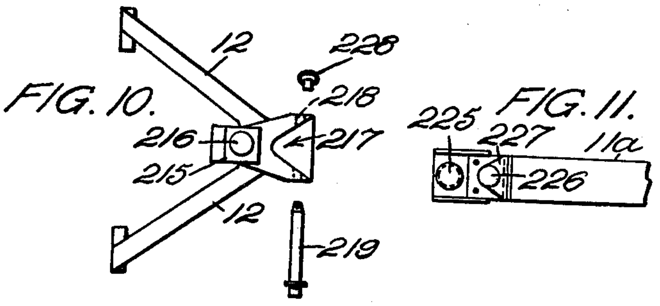
Figure 12:
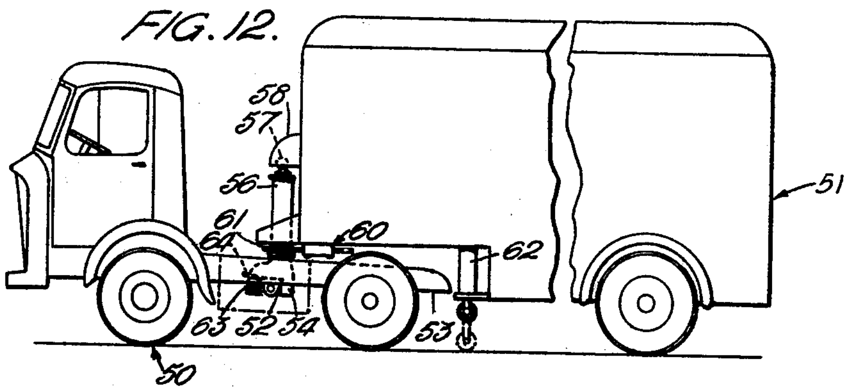
Figure 13:
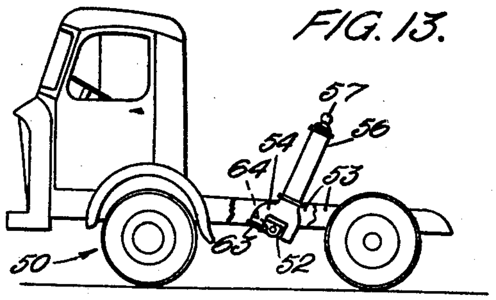
Figure 14:
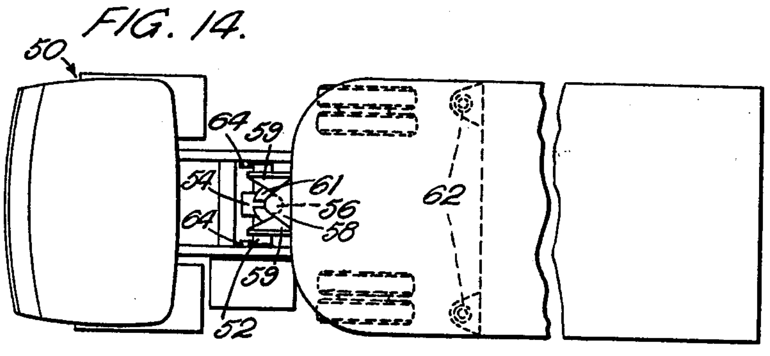
Figure 15:
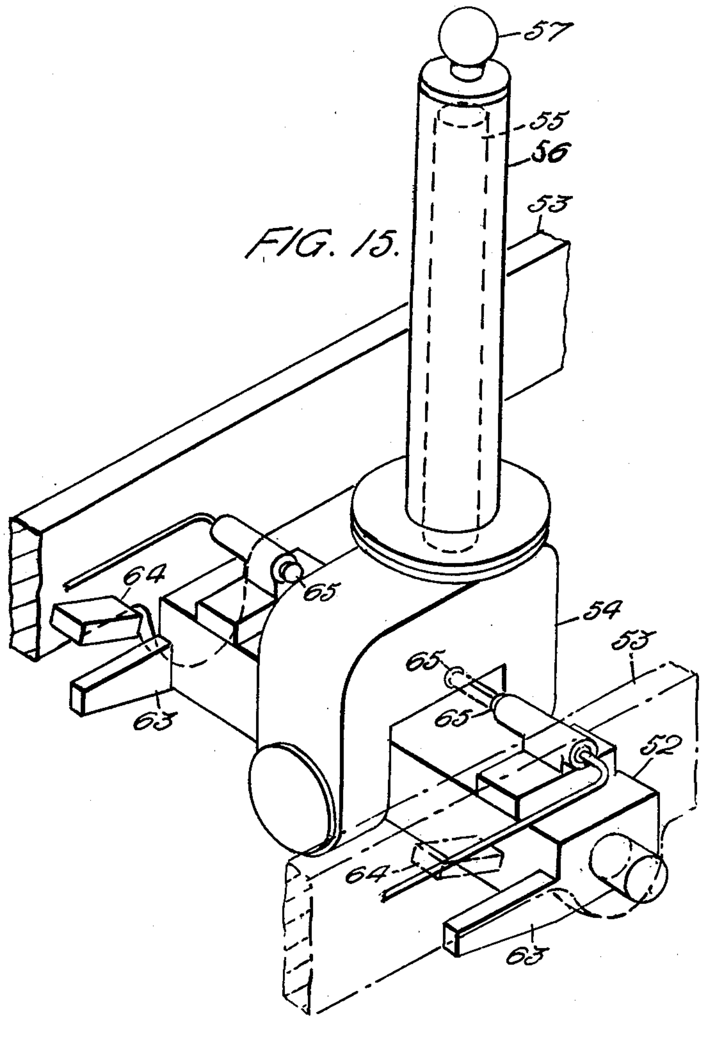
Figure 16:
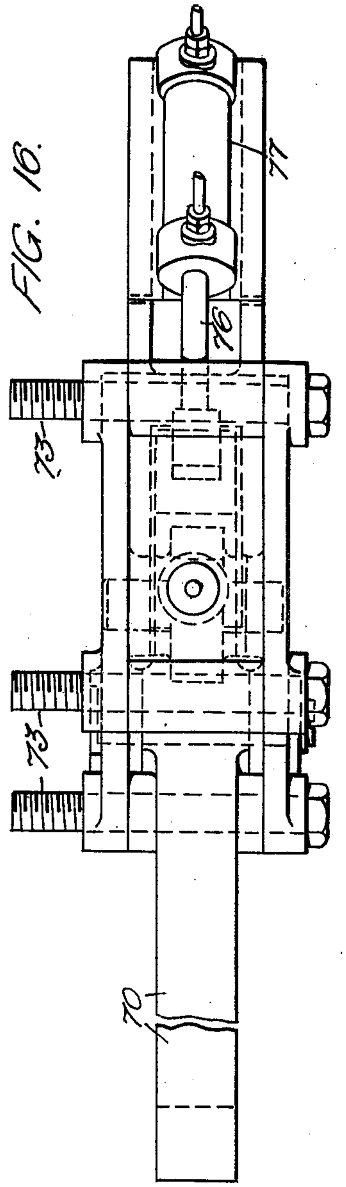
Figure 17:
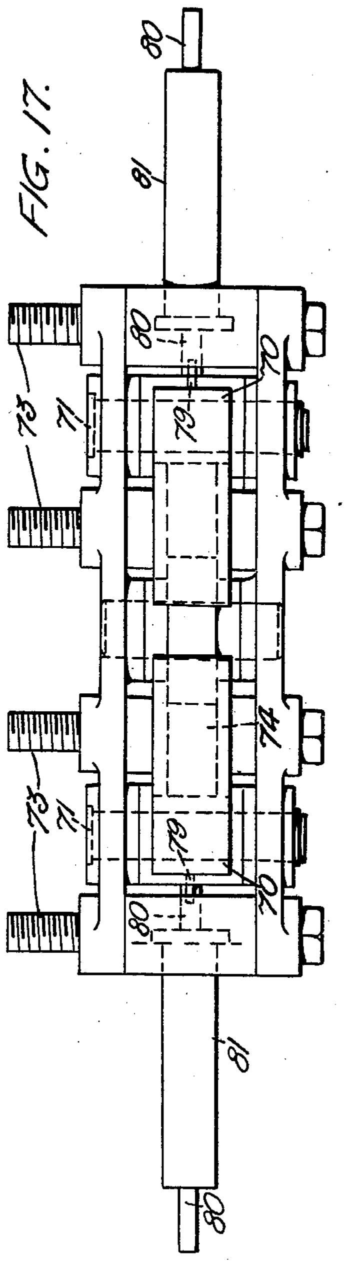
Figure 18:
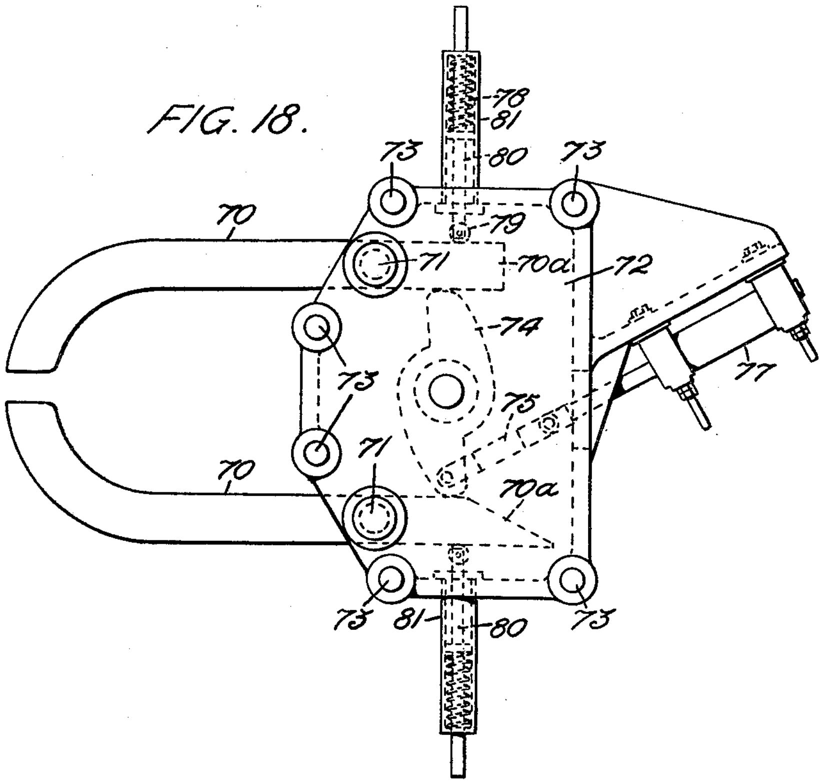

FIGURE 1 shows one construction of towing connection in side elevation and in the hitched condition, FIGURE 2 is a part plan view of FIGURE 1, FIGURE 3 is a side elevation showing another construction of towing connection joining tractor and trailer vehicles, FIGURE 4 is a view corresponding to FIGURE 3 showing the towing connection unhitched, FIGURE 5 is a view in the direction of arrow 5 on FIGURE 4, FIGURE 6 shows part of a towing connection similar to that employed in FIGURES 3 to 5, FIGURE 7 is a plan view of FIGURE 6, FIGURES 8 and 9 are views like FIGURES 3 and 4 of yet another construction, FIGURES 10 and 11 are views in the direction of arrows 10 and 11 respectively of FIGURE 9, FIGURE 12 is a side elevation of a further construction suitable for use in road haulage, FIGURE 13 shows the motor vehicle of FIGURE 12 unhitched from the trailer, FIGURE 14 is a plan view of FIGURE 12, FIGURE 15 shows the towing connection of FIGURES 12 to 14 in detail, FIGURE 16 shows in side elevation a form of locking means, FIGURE 17 is a front elevation of FIGURE 16, and FIGURE 18 is a plan view of FIGURE 16.

The towing connection illustrated in FIGURES 1 and 2 is suitable for hitching a tractor to a trailer adapted to move heavy loads.

The rear wheels of the tractor are indicated at 10 and their axis of rotation is indicated at 10*a*, this axis being normal to the plane of the drawing in FIGURE 1. The trailer vehicle (not shown) has an integral tow bar 11, the forward portion 11*a* of which is of goose neck formation to allow the tow bar to clear the tractor wheels 10 when fore and aft line of the trailer is turned at 90° or more to that of the tractor. The extreme forward end of the goose neck 11*a* extends substantially vertically downwards when the trailer is on level ground.

The towing connection illustrated comprises a rigid beam 12 in the form of an A-frame, the side members of which converge rearwardly, the forward ends of the side members being pivoted to brackets 13 mounted on the tractor close to each of the rear wheels 10. The pivotal axis of the beam 12 is at 12*a* and it extends normal to the plan of the drawing (FIGURE 1) and is disposed below the axis 10*a* of rotation of the wheels 10. The axis 12*a* is also shown positioned slightly forwards of the axis 10*a* in relation to the direction of travel of the tractor, but it may be at any other position relative to the axis 10*a* from immediately below it and forwards thereof so that the trailer load tends to hold all the wheels of the tractor on the ground.

The rear end of the beam 12 has pivoted to it a rigid member which comprises a bifurcated saddle 14, the ends 14*a* of which house bearings to receive a pivot pin connecting the saddle 14 to the beam 12, and an upstanding pillar 15 which is rigid with the saddle 13. The pivotal connection between the beam 12 and saddle 14 permits swinging of the rigid member 14, 15 about an axis 14*b* extending in the fore and aft direction of the tractor and normal to the axis 12*a*. The beam 12, its mounting brackets 13, and the pivotal connection between the beam 12 and saddle 14 thus constitute articulating means connecting the rigid pillar 15 to the tractor with freedom about two axes at right angles.

The pillar 15 is received in bearings housed in a box-section mounting sleeve 16 so that these parts can rotate relative to one another about an axis 16*a* which is normal to the plane containing the axes 12*a*, 14*b*. At its upper end and remote from the saddle 14, the sleeve 16 has welded to it a ball shaped abutment member 17, the centre of which is offset from the axis 16*a*.

The parts of the towing connection so far described are carried by the tractor when the towing connection is unhitched.

The remaining parts of the towing connection are mounted on the trailer and in the present arrangement are mounted on the forward downwardly depending end of the goose neck 11*a*. These parts ensure that the abutment member 17 and the sleeve 16 take up their correct position during the hitching operation.

The parts on the trailer include an inverted cup-shaped abutment socket 18 which is welded to the goose neck 11*a* and is adapted to receive and to locate the ball-shaped abutment member 17 relative to the goose neck 11*a*, and guide plates 19 which are welded to the goose neck 11*a* and which by their edges 19*a* (FIGURE 2) form a convergent guide channel which during the hitching operation leads the lower end of the sleeve 16 (and thus the pillar 15) into the hitched position shown. The edges 19*a* terminate in short parallel portions 19*b* for finally positioning the sleeve 16 laterally relative to the goose neck 11*a*.

The towing connection also includes means to lock the mounting sleeve to the goose neck once the sleeve is in its proper position relative to the goose neck The locking means may comprise a pin 21 to extend through aligned holes 20 in the ball and cup-shaped abutments and pivoted catches, for example as described hereinafter with reference to FIGURES 16 to 18, to hold the lower end of the sleeve 16 in position.

The arrangement described not only allows articulation of the tractor and trailer about the three axes 12*a*, 14*b*, 16*a* during towing, but also allows the towing connection to be hitched even though the vehicles are not properly aligned or are on unlevel ground, and during hitching allows an upward thrust to be applied to the trailer vehicle so relieving, wholly or in part, the load on jacks or the like supporting the front of the trailer vehicle. The jacks may, for example, be mounted on the forward end of the goose neck 11 or rearwards of it.

Assuming the tractor and trailer vehicles to be unhitched, the parts of the towing connection mounted on the tractor will be supported by cables or chains connecting the sleeve 16 to the tractor so that the beam 12 extends somewhat downwards from its axis 12*a* for instance as indicated by line 12*b* and so that the mounting sleeve 16 is prevented from swinging to any great extent about axis 14*b*. Thus the abutment member 17 will be at a level below the cup-shaped abutment 18 which will also be somewhat below the level indicated.

To engage the towing connection, the tractor is backed towards the trailer until the abutment member 17 strikes the goose neck below the cup-shaped abutment 18. When this position is reached the sleeve 16 has just entered between the guides 19 and the cables or chains supporting the mounting sleeve are slackened. The tractor is now maneuvered backwards so that the abutment member 17 slides upwards along the goose neck towards the cup-shaped abutment 18 until the members 17, 18 are engaged, this movement being accompanied by upward swinging of the beam 12, and also by swinging of the rigid member 14, 15 about the axis 14*b* if necessary. At the moment of full engagement of the ball and socket abutment 17, 18, the beam 12 and pillar 15 have not reached the full line position shown, but beam 12 is still downwardly inclined and the pillar 15 is inclined to the right of the position shown Further backing of the tractor causes the parts 15, 16 to swing about the ball and socket abutments into the position shown, this movement being accompanied by swinging of the beam 12 into its full line position. This movement clearly lifts the abutment 18 so that loads on the jacks supporting the forward end of the trailer are relieved. Normally the towing connection will be designed to relieve the whole of the load, but under some conditions, for instance due to the state of the ground, this may be impossible and in this case the jacks will be required to support the trailer with the cup-shaped abutment at a level such that no substantial lifting is required during the last part of the hitching operation.

Once the hitching operation above described is complete, the locking means is engaged. Thereafter the usual service, e.g. braking and lighting services, may be connected up.

Referring now to FIGURES 3 to 5, there is illustrated a further construction of towing connection which is basically similar to that described with reference to FIGURES 1 and 2, and in these figures the same references are used to illustrate like parts.

In this construction, however, the abutment carried by the mounting sleeve 16 comprises a fixed upwardly extending member 25 having an edge 25*a* inclined to the axis of the mounting sleeve 16 and leading downwardly into a notch 26. The co-operating abutment member comprises a pair of laterally spaced lugs 27 welded to the downwardly-extending portion 11*a* of the goose neck and supporting a transverse pin 28.

At its lower end the forward portion 11*a* of the goose neck has secured to it a pair of guide plates 29, the adjacent edges 29*a* of which constitute a convergent guide channel for the lower end of the mounting sleeve 16. The guide plates 29 have holes 34 in them to receive a locking pin 31 which is inserted manually after the hitching operation has been completed. One end of the pin 31 is pierced to receive a pin retainer 32.

The operation of hitching is performed in exactly the same way as described with reference to FIGURES 1 and 2. As the tractor is backed towards the trailer the pillar at 15 and mounting sleeve 16 are inclined rearwardly as seen in FIGURE 4, and when the projection 25 strikes the downwardly-extending forward portion of the goose neck 11*a*, the parts of the towing connection which are mounted on the tractor swing upwardly until the edge 25*a* strikes the pin 28. Thereafter the pin is guided down the edge 25*a* into the notch 26 and further rearward movement of the tractor results in swining of the mounting sleeve 16 relative to the goose neck about the pin 28 into the guide channel formed by the edges 29*a*, which constrain the mounting sleeve 16 to take up the position shown in FIGURE 3. During the latter part of this movement an upward load is applied to the trailer through the pin 28. When the parts have reached the position shown in FIGURE 16 the pin 31 is inserted through the holes 30 in the guide plate 29 so locking the mounting sleeve in position for towing. The pin retainer 32 is next inserted to prevent inadvertent withdrawl of the pin 30.

The upwardly directed load applied to the trailer relieves the load on the jacks 33 which may now be raised to the position shown in FIGURE 3.

Referring now to FIGURES 6 and 7 there is illustrated a modification of part of the towing connection as shown in FIGURES 3 to 5. In this construction the lugs 27 and the guide plates 29 are welded to a heavy box girder 40 which in turn is welded to the front face of the downwardly-extending portion 11*a* of the goose neck. In this case, moreover, the mounting sleeve 116 does not extend from the guide plates 29 upwardly to adjacent the lugs 27 but it terminates approximately midway between these parts. The mounting sleeve 116 has secured to its upper end as by welding a strong girder member 117 to the upper end of which the abutment 25 is welded.

In this construction, moreover, means is provided to stregthen the pin 31 against loads experienced during towing. This means comprises a loose bar 118 having at each end a downwardly-depending lug 119, these lugs having holes in them for the passage of pin 31. The bar 118 has an arcuate notch in its rearward edge to fit against the mounting sleeve 116.

As in the previous construction the pillar 15 which is rotatably mounted within the mounting sleeve 116 is connected with the tractor through articulating means formed by a beam 12 pivoted at its forward end to the tractor and by a saddle 14 pivoted to the rear end of the beam 12.

Referring now to FIGURES 8 to 11, another form of towing connection is illustrated which is similar to those previously described.

As in the previous constructions, parts of the towing connection are mounted on the tractor and parts are mounted on the trailer.

The towing connection comprises a beam 12 which swings about a transverse axis by being pivoted to brackets 13 mounted on the axle casing of the rear wheels 10 of the tractor.

The towing connection also includes a saddle 214 pivoted to the rear end of the beam 12 to swing about a fore and aft axis. The saddle has rigidly secured to it a pillar 215 which extends at right angles to the plane containing the two pivotal axes, and which carries at its upper end one of the abutment members, shown in the form of a ball 216. The saddle member 214 is also formed with a forwardly-converging guide channel 217 towards the rear end of which the saddle is formed with aligned holes 218 to receive a locking pin 219.

The pillar 215 has a perforated lug 220 on its forward face to receive one end of a chain 221 or the like by which the parts of the towing connection mounted on the tractor are supported in the position shown in FIGURE 9 prior to hitching.

The towing connection also comprises a rigid pillar 222 forming the downwardly-extending portion of the goose neck 11*a*, the pillar 222 providing a support for a mounting sleeve 223 which can rotate about the axis of the pillar 222.

At its upper end the mounting sleeve 223 has secured to it forwardly-extending lugs 224 carrying a cup-shaped socket 225 to receive the ball abutment 216 on the pillar 215. The mounting sleeve 223 at its lower end has a cylindrical downward extension 226 which during hitching enters the guide channel 217 and the extension supports a block 227 which is grooved on its rear surface to co-operate with the pin 219 when it is inserted.

As in the previous constructions the rigid pillar 215 is connected to the tractor by articulating means permitting pivoting of the member about two axes at right angles. Also, as in the previous constructions, during rearward movement of the tractor when hitching the ball 216 engages the socket 225 and thereafter an upward load is applied to the trailer relieving the load on the jacks 33 and simultaneously the member 215 pivots about the ball relative to the goose neck into the position shown in FIGURE 8. Thereafter the pin 219 is inserted to lock the parts in position. A pin retainer 228 is passed through a hole in the end of the pin 219 to retain the pin against inadvertent removal.

It will be appreciated that although the pillar 215 is locked to the mounting sleeve 223, the towing connection provides for articulation of the trailer relative to the tractor about three axes of freedom which axes are mutually at right angles. The first axis is provided by the pivotal connection between the beam 12 and the tractor, the second axis is provided by the pivotal connection between the saddle 214 and the beam 12, and the third axis of freedom is provided by the rotative freedom of the mounting sleve 223 about the pillar 222.

The towing connection of this invention is not only applicable to heavy "earth moving" trailer towing, but is also applicable to road haulage, for example, as illustrated in FIGURES 13 through 15.

The arrangement shown comprises a motor vehicle 50 and a rear wheeled box-type trailer 51 inter-connected by a towing connection in accordance with this invention.

As in the previous constructions, parts of the towing connection are connected to the motor vehicle and other parts are mounted on the trailer. The towing connection comprises a beam 52 extending transversely between and pivoted to longitudinal chassis members 53 of the towing vehicle 50. The pivotal axis will be situated as low as possible relative to the ground.

The towing connection also comprises a saddle 54 pivoted to the mid-length of the beam 52 to swing about a fore-and-aft axis and the saddle 54 has rigidly secured to it and upwardly extending from it a pillar 55. The pillar 55 extends at right angles to the plane containing the pivotal axes of the beam 52 and saddle 54.

The pillar 55 is surrounded by a mounting sleeve 56 which houses bearings for the pillar 55 so that the sleeve and pillar can rotate relatively to one another about the axis of the pillar. At its upper end the mounting sleeve 56 carries an abutment in the form of a ball 57.

The remaining parts of the towing connection are secured to the front wall of the box-type trailer 51. These parts include a second abutment in the form of a socket 58 to receive the ball 57, a pair of guide plates 59 having converging edges forming a convergent guide channel for the lower end of the mounting sleeve 56, and locking means generally indicated at 60 which locking means comprise a pair of arms 61 swingable between an inoperative position in which they allow the mounting sleeve 56 to pass between them and an operative position as shown for example in FIGURE 14 in which they embrace the mounting sleeve 56 and prevent it from moving from the guide channel. The locking means may for example be constructed and arranged to operate as described with reference to FIGURES 16 to 18.

When the box trailer 51 is detached from the towing vehicle, the front end of the trailer is supported on jacks 62.

It will be appreciated that like the previously described constructions the towing connection not only allows articulation of the trailer vehicle relative to the towing vehicle about three axes which are mutually at right angles, but also permits ready hitching and unhitching of the vehicles. Also it will be clear that during hitching an upward load is applied to the front end of the trailer vehicle through the abutments 57, 58 so relieving the jacks of their load and permitting them readily to be raised.

When the motor vehicle is detached from the trailer the parts of the towing connection are constrained to remain in the position shown in FIGURE 13 by the provision of the forwardly-extending lugs 63 on the beam 52 which lugs co-operate with stops 64 mounted on the longitudinal members 53 of the towing vehicle chassis, and by the provision of hydraulically extensible stops 65 mounted on the beam 52, which stops 65 when extended hold the saddle 54, pillar 55 and sleeves 56 in a vertical fore-and-aft plane. When the connection is hitched the stops 65 are retracted.

Referring now to FIGURES 16 to 18, there is illustrated one suitable form of locking means which can be power-locked.

The locking means comprises a pair of arms 70 which are shaped at their forward ends to embrace a mounting sleeve such as for example as is shown at 16 in FIGURE 1 and at 56 in FIGURES 13 to 15, the arms being pivoted at 71 in a frame 72 which can be secured by bolts 73 to the underside of the towed vehicle for example. The arms 70 have tails **70*a* for co-operation with a cam 74 pivoted in the frame 72 between the tails 70*a*. The cam 74 is connected by a link 75 to the piston rod 76 of a hydraulic ram 77 mounted on the frame 72. When the ram is extended the parts are in the position shown in FIGURE 18 with the tails 70*a* spread apart and the arms 70 moved to the locking position. When the ram is contracted, springs 78 acting on the tails 70*a* through rollers 79 carried on sliding rods 80 urge the tails inwardly and open up the arms 70 to release the mounting sleeve. The rods 80 slide in housings 81 for the springs which housings are mounted on the frame 72** at each side thereof.

Apart from the desirable characteristics of the towing connections above described, the arrangements have the advantage that little modification of existing trailer vehicles is necessary to enable the invention to be used in connection with them, and that a single tractor can be employed to handle a large number of trailers which is important when the loading time for the trailer is relatively long, or where a trailer is required to be drawn over rough ground by a tractor, and to be drawn over roads by a road vehicle.

I claim:

1. A towing connection for connecting two vehicles and permitting the vehicles to be hitched and unhitched, said towing connection comprising:

(*a*) a beam adapted at one end for pivotal connection to one of said vehicles to swing about a first axis parallel to the rear axle of said one vehicle, (*b*) a saddle member pivotally connected to said beam at its other end to swing about a second axis extending fore and aft of the vehicles and at right angles to said first axis, (*c*) said saddle member having a pillar part rigid therewith and extending upwardly therefrom at right angles to said first and second axes, (*d*) a tow bar on the other of said vehicles, (*e*) said tow bar having at its forward end a downwardly depending part, and (*f*) means interconnecting said pillar part and said downwardly depending part and permitting both relative rotation of said parts about a vertical axis, which is at right angles to both said first axis and said second axis, and hitching and unhitching of said parts, said means including (*g*) a sleeve rotatively mounted on one of said parts to rotate about said vertical axis, (*h*) a first abutment on said sleeve adjacent its upper end to rotate therewith, (*i*) a second abutment rigidly mounted on the other of said parts adjacent the upper end thereof, said first and second abutments being brought into abutment by upward movement of one relative to the other, (*j*) guide means carried on said other of said parts and below said second abutment, said guide means defining a channel which is open towards said sleeve, said sleeve entering said channel during movement of the tractor vehicle towards the trailer vehicle and being guided to a position in which both said parts are vertical and said abutments are engaged, and (*k*) retractable locking means on said other of said parts and releasably retaining said sleeve in said channel.

2. A towing connection according to claim 1, said guide means being in fixed spaced relation to said second abutment and defining a convergent channel which converges away from the sleeve.

3. A towing connection according to claim 1, one of the abutments being a ball and the other being a socket to receive the ball and locate it during hitching.

4. A towing connection according to claim 3, wherein the abutments are locked together after hitching by a pin passing through the aligned holes in the ball and in the socket.

5. A towing connection according to claim 1, the abutments being a bar and a notched member respectively, the bar being engaged in the notch during hitching.

6. A towing connection according to claim 1, the locking means comprising a retractable locking pin extending across the convergent channel at its wider end, the pin retaining the sleeve in the channel.

7. A towing connection according to claim 6, the locking means comprising a bar having a notch to fit the sleeve, and lugs through holes in which the locking pin extends, said bar extending between the lugs whereby the pin is strengthened.

8. A towing connection according to claim 1, wherein the locking means comprises a pair of arms adapted to embrace the sleeve to hold it in the channel and operating means to move the arms between an operative position in which to hold the sleeve in the channel, and an inoperative position clear of the sleeve.

9. A towing connection according to claim 8, wherein the operating means comprises a ram moving the arms to the operative position against the load of springs which urge the arms towards the inoperative position.

10. A towing connection for connecting two vehicles and permitting the vehicles to be hitched and unhitched, said towing connection comprising (*a*) a beam adapted at one end for pivotal connection to one of said vehicles to swing about a first axis parallel to the rear axle of said one vehicle, (*b*) a saddle member pivotally connected to said beam at its other end to swing about a second axis extending fore and aft of the vehicles and at right angles to said first axis, (*c*) said saddle member having a pillar part rigid therewith and extending upwardly therefrom at right angles to said first and second axes, (*d*) a tow bar on the other of said vehicles, (*e*) said tow bar having at its forward end a downwardly depending part, and (*f*) means interconnecting said pillar part and said downwardly depending part and permitting both relative rotation of said parts about a vertical axis, which is at right angles to both said first axis and said second axis, and hitching and unhitching of said parts, said means including (*g*) a sleeve rotatably mounted on said pillar part to rotate about said vertical axis, (*h*) a first abutment carried on said sleeve adjacent its upper end to rotate therewith, (*i*) a second abutment rigidly mounted on said downwardly depending part of the tow bar adjacent the upper end thereof, said first and second abutments being brought into abutment by upward movement of the first abutment towards the second abutment, (*j*) guide means carried by said downwardly depending part below said second abutment, said guide means defining a channel which is open towards the sleeve, said sleeve entering said channel during movement of the tractor vehicle towards the trailer vehicle and being guided to a position in which both said pillar part and said downwardly depending part are vertical and in which said abutments are engaged, and (*k*) retractable locking means on said downwardly depending part releasably retaining said sleeve in said channel.

11. A towing connection according to claim 10, said guide means defining a convergent guide channel and being mounted on said downwardly depending part in fixed spaced relation to said second abutment, said convergent channel converging in a direction away from the sleeve.

12. A towing connection for connecting two vehicles and permitting the vehicles to be hitched and unhitched, said towing connection comprising (*a*) a beam adapted at one end for pivotal connection to one of said vehicles to swing about a first axis parallel to the rear axle of said one vehicle, (*b*) a saddle member pivotally connected to said beam at its other end to swing about a second axis extending fore and aft of the vehicles and at right angles to said first axis, (*c*) said saddle member having a pillar part rigid therewith and extending upwardly therefrom at right angles to said first and second axes, (*d*) a tow bar on the other of said vehicles, (*e*) said tow bar having at its forward end a downwardly depending part, and (*f*) means interconnecting said pillar part and said downwardly depending part and permitting both relative rotation of said parts about a vertical axis, which is at right angles to both said first axis and said second axis, and hitching and unhitching of said parts, said means including (*g*) a sleeve rotatably mounted on said downwardly depending part of the tow bar to rotate about said vertical axis, (*h*) a first abutment mounted on said sleeve adjacent its upper end to rotate therewith, (*i*) a second abutment rigidly mounted on the upper end of said pillar part, said first and second abutments being brought into abutment by upward movement of the second abutment relative to the first abutment, (*j*) guide means rigid with said pillar part adjacent its lower end, said guide means defining a channel which is open towards the sleeve, said sleeve entering said channel during movement of the tractor vehicle towards the trailer vehicle and being guided to a position in which both said pillar part and said sleeve are vertical and in which said abutments are engaged, and retractable locking means on said pillar part releasably retaining said sleeve in said channel.

13. A towing connection according to claim 12, said guide means being in fixed spaced relation to said second abutment and defining a convergent guide channel which converges away from the sleeve.

14. A towing connection according to claim 12, said first abutment comprising a cup-shaped socket carried on lugs extending forwardly from said sleeve, and said second abutment comprising a ball-shaped member to be received in said socket.

References Cited in the file of this patent

UNITED STATES PATENTS

| | | |
|---|---|---|
| 1,500,236 | Cochran | July 8, 1924 |
| 2,091,009 | Osman | Aug. 24, 1937 |